May 21, 1929.  F. AESCHBACH  1,714,066

DOUGH KNEADING AND MIXING MACHINE

Filed June 14, 1928

INVENTOR:

Friedrich Aeschbach
By Henry Orth Jr.
Atty.

Patented May 21, 1929.

1,714,066

UNITED STATES PATENT OFFICE.

FRIEDRICH AESCHBACH, OF AARAU, SWITZERLAND.

DOUGH KNEADING AND MIXING MACHINE.

Application filed June 14, 1928, Serial No. 285,328, and in Switzerland March 17, 1928.

The present invention refers to dough-kneading and mixing machines of the type having a rotating trough, two kneading arms and means to move the arms in elliptical paths and it has particular reference to the fixation of the arms to their supporting members. In order to permit a temporary quick and convenient removal of the arms from the supporting members or operating levers according to the present invention both parts are connected together by means of a screw bolt which passes through one member with clearance and engages it with its head whilst it cooperates with a screw thread provided in the other member, so that by a slight turning of the bolt the latter is axially displaced and its head gets out of engagement with the first member and vice versa when fixing the two parts together.

Figure 1:
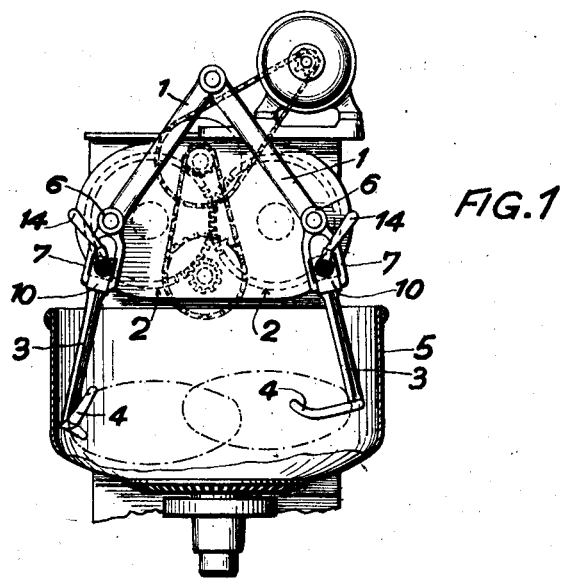
Figure 2:
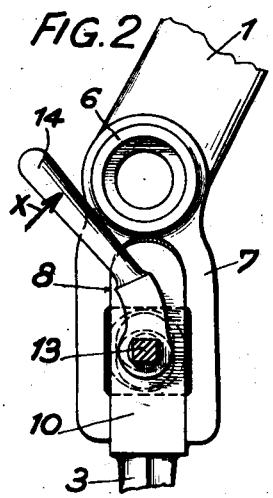
Figure 3:
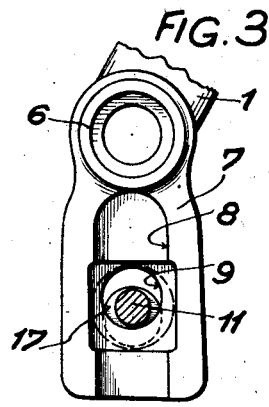
Figure 4:
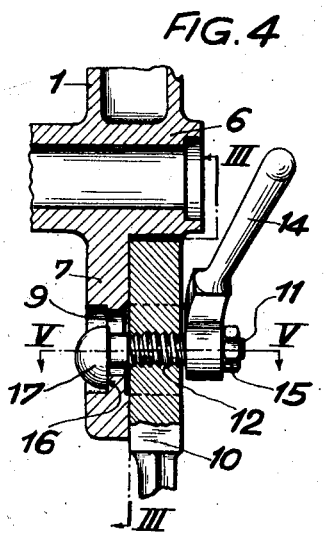
Figure 5:
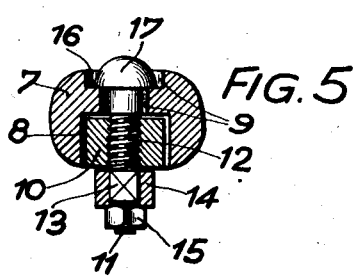
Figure 6:
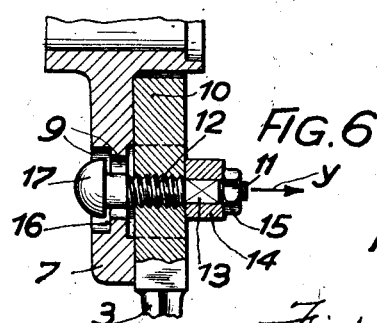

A constructional example of the subject matter of the present invention is illustrated on the accompanying drawing, in which Fig. 1 is an elevation with parts shown in section of the dough-kneading and mixing machine, Fig. 2 shows the fixation means in a front view, Fig. 3 is a vertical section along line III—III in Fig. 4, Fig. 4 is a vertical section showing the screw bolt in the position in which the arm is clamped to its support, Fig. 5 is a horizontal section along line V—V in Fig. 4, and Fig. 6 is a vertical section corresponding to Fig. 4 but showing the screw bolt in its loosened position.

Referring now to the drawings the dough-kneading and mixing machine illustrated in Fig. 1 is provided with operating levers 1 driven by crank disks 2, and 3 denotes the kneading arms detachably fixed to the levers 1. The lower ends or fingers 4 of the arms 3 are moved inside the trough 5 along elliptical paths indicated in dash and dot lines. Each lever 1 is provided with a part 7 extending beyond its boss 6 cooperating with the crank pin and in the part 7 a longitudinally directed recess 8 and a stepped transverse recess 9 (Fig. 5) are arranged. Each kneading arm 3 has at its upper end a head 10 formed to correspond to the recess 8 and inserted in the latter. The head 10 is provided with screw thread with which the screw threaded part 12 of a bolt 11 cooperates. The part of the bolt which projects on one side beyond the head 10 has a portion of square cross-section 13 on which a handle 14 is placed and held in position by means of a nut 15. At its other end the bolt 11, which passes with clearance through the transverse recess 9 of the part 7, is provided with an eccentrically arranged head 17 cooperating with the facing 16 of the recess 9. When the different parts are in the position shown in Fig. 4 the kneading arm 3 is fixed to the part 7 of the lever 1 by the clamping action caused by the tightened screw bolt 11.

If now the handle 14 is turned through an angle of approximately 180° in the direction of the arrow $x$ shown in Fig. 2 the bolt 11 is slightly displaced in the axial direction from the position illustrated in Fig. 4 into that shown in Fig. 6 whereby the pressure between the parts 10 and 7 is released. By turning the bolt the eccentric head 17 is also turned and it does no longer cooperate with the facing 16 so that the kneading arm 3 can be lifted off the lever in the direction of the arrow $y$ indicated in Fig. 6, as the head 17 can pass through the part of the smallest diameter of the recess 9.

This manner of fixation presents the advantage over the known fixation that its loosening and tightening is quickly obtained by a slight turning, and that no fixing means such as nuts and the like have to be removed from the lever or from the kneading arm.

I claim:

1. A readily disconnectible joint for two connectible parts comprising in combination, a perforated first part, a second part placed with its end upon the other part, and a screw bolt cooperating with a screw thread provided in said other part and having an eccentric head engaging with the first part to press both parts together, whereby a turning of the bolt causes an axial displacement of said bolt, and thereby a release of said pressure and a disengagement of said head and permits it to register with the perforation for removal of said second part.

2. A readily disconnectible joint for two parts of a lever arm comprising in combination, a first part of said lever arm provided with a recess in its end portion, a second part of said lever arm placed with its end portion against said first part, a screw bolt cooperating with a screw thread provided in said second part, a head eccentric on said screw bolt and engaging a facing of a recess in the first part to press said parts together, whereby a turning of the bolt causes an axial displacement of said bolt and thereby a release of said pressure and a disengagement between said head and first part which permits a removal of said arm.

3. A readily disconnectible joint for two parts of a lever arm comprising in combination, a first part of said lever arm provided with a longitudinal recess in its end portion, a second part of said lever arm shaped to correspond to said recess and inserted in the latter, a screw bolt cooperating with a screw thread provided in the end of the second part, a head eccentrically placed on said screw bolt and engaging in one angular position a facing of a second recess in the first part to press said parts together, a square portion on said bolt, and a handle cooperating with said square portion, whereby a turning of said bolt causes an axial displacement of the bolt, a release of the pressure and a disengagement between said head and said first part, to permit a removal of said second part.

In testimony whereof I have signed my name to this specification.

FRIEDRICH AESCHBACH.